United States Patent [19]

Loving

[11] Patent Number: 5,429,392
[45] Date of Patent: Jul. 4, 1995

[54] COMPOSITE MICRODOT AND METHOD

[76] Inventor: Charles D. Loving, 426 Country Club, Stansbury Park, Utah 84074

[21] Appl. No.: 79,631

[22] Filed: Jun. 18, 1993

[51] Int. Cl.⁶ .............................................. B42D 15/00
[52] U.S. Cl. ...................................... 283/72; 283/91; 283/93; 283/76; 283/901
[58] Field of Search ................... 283/72, 91, 93, 900, 283/901, 76

[56] References Cited

U.S. PATENT DOCUMENTS 4,984,824 1/1991 Antes et al. ............................ 283/91

*Primary Examiner*—Willmon Fridie
*Attorney, Agent, or Firm*—J. Winslow Young

[57] ABSTRACT

A composite microdot fabricated form a microdot and at least one composite layer. The composite layer is selected to impart to the composite microdot at least one of the characteristics of enhanced visibility, camouflage, buoyancy control, magnetic attraction, and controlled biodegradation. A second composite layer may also be applied to the microdot. A coating may also be selectively applied to the composite microdot, the coating having at least one of the features of being waterproof, water repellant, hydrophilic, soluble and opaque.

14 Claims, 2 Drawing Sheets

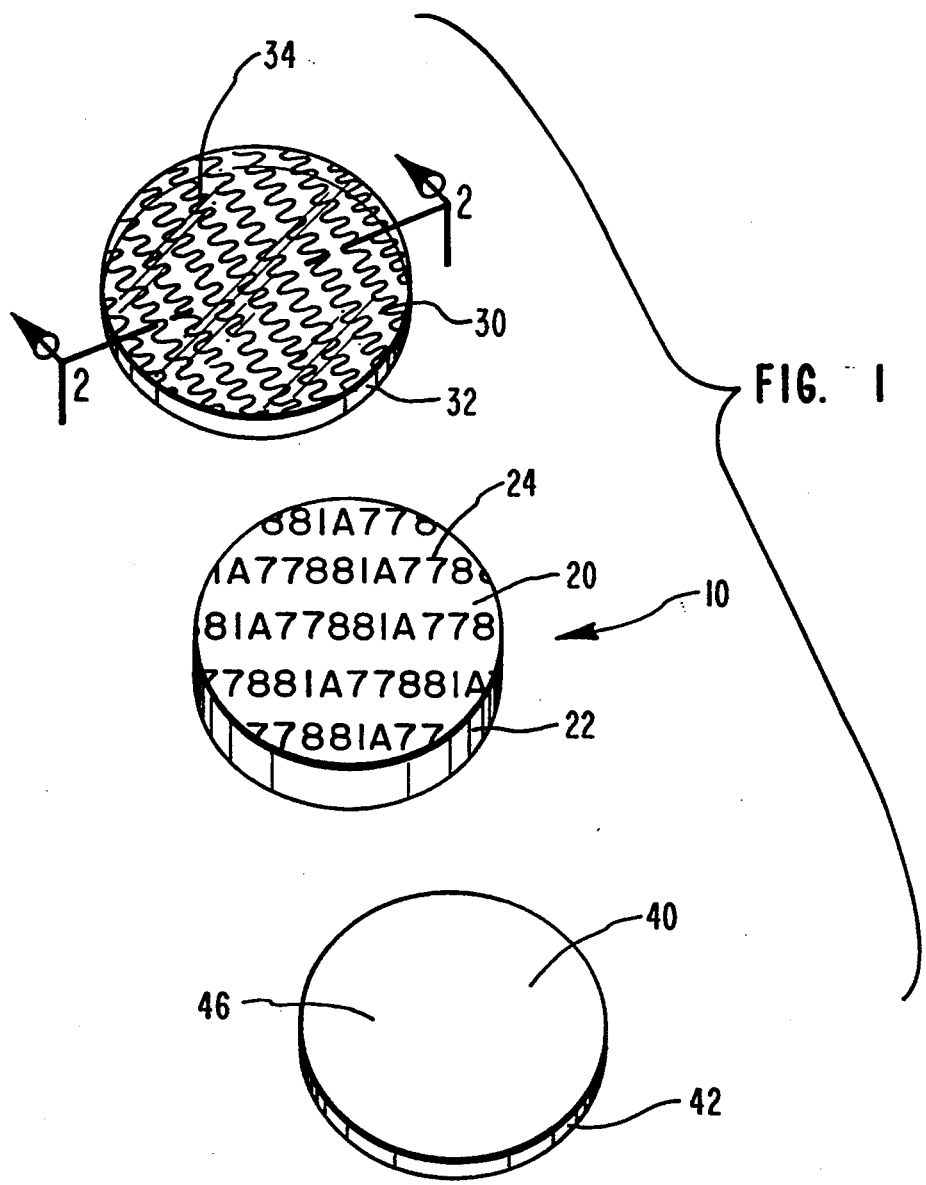
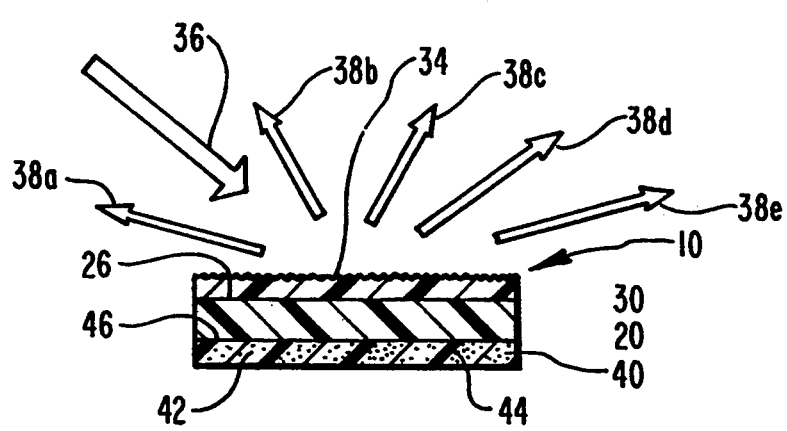
FIG. 2

COMPOSITE MICRODOT AND METHOD

BACKGROUND

1. Field of the Invention

This invention relates to microdots and, more particularly, to a novel, composite microdot and method wherein different types of composite layers are selectively affixed to the microdot to provide the microdot with various, preselected features such as enhanced visibility, camouflage, magnetic attraction, controlled buoyancy, and controlled biodegradation, to name several.

2. The Prior Art

Microdots, as the name implies, are small, usually less than about two millimeters in diameter, discs cut from a plastic substrate. Each microdot is configured to carry a unique identification feature such as a preselected color or a specific serial number to enable the subsequent finder of the microdot to identify the origin of the microdot. In one application, the microdot is imprinted with a specific serial number and is accompanied by several hundred or even thousands of identical microdots. These microdots are then placed discretely and even openly at numerous locations on various items of personal property on the premise that one or more of these microdots will be subsequently retrieved and thereby reveal the correct ownership of the item of personal property. The principle concept is that it is virtually impossible for a miscreant to remove all the microdots from the item. Further, some microdot systems are designed to allow a portion of the microdots to be dislodged during transit to thereby leave a trail of microdots which provide credible evidence as to the prior locations of the item, thus aiding in the apprehension of the miscreant and any cohorts.

Several microdot technologies are known in the art. Perhaps one of the earliest references in this field is that of Dillon (U.S. Pat. No. 4,243,734 which discloses a microdot configured as a square having a side dimension in the nature of 0.007 inch. Each microdot includes the indicia of the particular owner.

Another identification system that uses a plurality of small labels, not microdots, per se, is that of Krietemeier et al (U.S. Pat. No. 4,763,928). This disclosure relates to small tags which are cut from a strip of plastic but releasably held on a substrate to allow the person applying the tags to individually retrieve a tag from the plastic strip and mount it to the item.

From the foregoing it is clear that various attempts have been made to provide a microdot identification system for an item of personal property. However, there are numerous instances where it would be desirable to have a microdot that could be used not only to mark items of personal property but also in applications not involving an item of personal property. It would also be advantageous to provide a microdot system, where the microdot is readily visible, where the microdot is camouflaged, has a preselected buoyancy, can be attracted to a magnetic field, or even will biodegrade after a period of time. Such a novel apparatus and method is disclosed and claimed herein.

BRIEF SUMMARY AND OBJECTS OF THE INVENTION

This invention is a composite microdot and method whereby selected surface materials are applied to the microdot to impart to the microdot a preselected characteristic. In one embodiment a holographic film having a broad spectrum holographic effect is affixed to one set of microdots to thereby render these microdots readily visible at a significant distance. Another microdot is encapsulated in a waterproof film, the density of the film being preselected so as to impart a predetermined buoyance to the microdot. A magnetic material affixed to another microdot renders the microdot capable of being magnetized and even recoverable using a magnetic collector. Camouflage-like layers allow for the unobtrusive distribution of the microdots on or in an item without otherwise revealing the presence of the microdots. Certain applications will also benefit from a microdot that will suitably biodegrade over a preselected period of time.

It is, therefore, a primary object of this invention to provide improvements in microdots. Another object of this invention is to provide improvements in the method of fabricating a microdot to provide the microdot with preselected characteristics.

Another object of this invention is to provide a composite microdot, the composite material being specifically selected to impart desired characteristics to the microdot.

Another object of this invention is to provide a microdot with a holographic surface to enhance the visual observance of the microdot.

Another object of this invention is to provide a microdot with a waterproof film that protects the microdot against moisture.

Another object of this invention is to provide a microdot with a waterproof film that imparts a preselected degree of buoyance to the microdot.

Another object of this invention is to provide a camouflage covering to a microdot to conceal its presence.

Another object of this invention is to provide a magnetic film laminate to the microdot to facilitate recovery of the microdot using a magnetic field.

Another object of this invention is to provide a microdot with a material that is subject to biodegradation over a preselected period of time.

These and other objects and features of the present invention will become more readily apparent from the following description in which preferred and other embodiments of the invention have been set forth in conjunction with the accompanying drawing and appended claims.

BRIEF DESCRIPTION OF THE DRAWING

FIG. 1 is a greatly enlarged, exploded perspective view of one presently preferred embodiment of the novel composite microdot of this invention;

FIG. 2 is a side elevation of the composite microdot of FIG. 1 shown assembled into a microdot;

DETAILED DESCRIPTION OF THE PREFERRED EMBODIMENT

Figure 3:
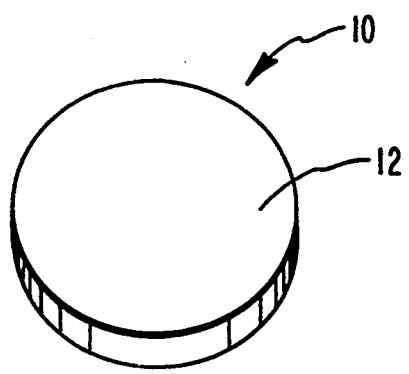
FIG. 3 is a perspective view of the microdot of FIG. 2 coated with a preselected coating.

The invention is best understood by reference to the drawing wherein like parts are designated by like numerals throughout in conjunction with the following description.

GENERAL DISCUSSION

The novel composite microdot and method of this invention incorporates various features into the microdot, each feature imparting a different, unique characteristic to the conventional microdot, hence the name, composite microdot. The unique characteristics imparted to the conventional microdot include such features as a holographic surface to render the microdot highly visible, a camouflage surface to disguise the microdot, a magnetic surface to render the microdot magnetically attractive, a waterproof surface to prevent aqueous degradation of the microdot in an aquatic environment, a biodegradable surface to render the microdot or its coating biodegradable over a period of time, or combinations of the foregoing.

One example of a composite microdot having a combination of features is a microdot system I designed for the purpose of assuring the proper disposal of contaminated soil. In one particular application, it is desirable to assure that contaminated soil recovered from a site of soil contamination is delivered to a proper disposal site and not merely dumped on the wayside at an out of the way location. In this instance I provide a microdot set having a holographic film on one or both sides and then camouflaged with a water soluble or biodegradable coating. The microdots are scattered throughout the contaminated soil during loading of the soil on the truck. The microdots being camouflaged can not be seen and thus removed. Once loaded on the truck the contaminated soil should be delivered to the designated disposal site within a given number of hours. However, in the event the contaminated soil is improperly dumped at a place other than the designated disposal site, the microdots will ultimately reveal which load was improperly dumped and by whom. Normal weathering will remove the water soluble or biodegradable coating to expose the holographic surface which, in turn, renders the microdot highly visible. In one experiment the individual composite microdots of my invention configured with the holographic surface were readily visible from a helicopter flying at about 2,000 feet above the ground.

The holographic film used in the foregoing experiment was obtained from Spectratek, Inc., Los Angeles, Calif. This particular holographic film is produced with a full spectral reflectance at all angles to the surface of the film so that intense "flashes" of light are reflected by the microdot regardless of its angular orientation relative to the light source.

Another composite microdot is one having a magnetic film as part of the surface of the microdot. The magnetic film can be any suitable magnetic medium including films made from magnetic ink, ceramic magnetic material, and the like. Customarily, the purpose of the magnetic surface is to enable the microdot to be retrieved using a conventional magnet to attract the magnetic film along with the attached microdot. For example, to track a particular product such as a bulk shipment of illegal drugs composite microdots with the magnetic surface are camouflaged to be disguised in the drug. In most cases, this camouflage would be a nonglossy white coating that is water or alcohol soluble. At its destination a simple magnet can be used to retrieve one or more microdots which, when cleansed of the camouflage coating, can be examined to reveal the indicia on the microdot thereby providing positive identification of source of the shipment of illegal drugs.

Tracking of sewage sludges, or other liquid systems in an aquatic environment is possible using a buoyancy control composite layer to match the buoyancy of the particular material being monitored. For example, a sewage sludge generally is incrementally heavier than water so that it usually sinks to the bottom of the water system into which it is dumped. The controlled or matched buoyancy of the microdot means that the microdots will remain with the bulk of the sewage sludge. The microdots can then be retrieved through magnetic attraction per the previous embodiment and/or be configured to suitably biodegrade over a preselected period of time. Further, the biodegradation could be only of the buoyancy regulator surface so that the microdots would subsequently float to the surface and there be highly visible as a result of an uncovering of a holographic layer on the microdot underneath the buoyancy control/camouflage layer.

DETAILED DESCRIPTION

Referring now to FIGS. 1 and 2, the first preferred embodiment of the novel, composite microdot apparatus of this invention is shown generally at 10 and includes a microdot 20, a first composite layer 30, and a second composite layer 40. Microdot 20 is a conventional microdot fabricated from a substrate 22 having an indicia 24 printed thereon. Substrate 22 is any suitable film-like material such as mylar, or the like, and is configured to have indicia 24 printed thereon. Indicia 24 is produced on microdot 20 by conventional microfilm techniques whereby a large sheet of indicia 24 is photographically reduced such that at least one, if not more, of individual indicia, in this case the alphanumeric set 77881A, is displayed as a complete set on microdot 20 regardless of where microdot 20 was cut from the body of substrate 22.

First composite layer 30 is shown herein as a holographic substrate 32 having a reflective hologram 34 formed therein. Substrate 32 is prepared from a clear plastic material to thereby render it sufficiently transparent to permit visual observation of indicia 24 therethrough. Hologram 34 is configured to provide a reflective surface on first composite layer 30 so as to reflect incident light in a full, 360 degree pattern from composite layer 30. This feature is illustrated schematically in FIG. 2 wherein incident light 36 is shown being reflected in a full, 360 degree pattern as reflected light 38a–38e.

Second composite layer 40 is fabricated from a substrate 42 having any number of preselected characteristics. For example, substrate 42 can be fabricated from a magnetic material such as a ferro magnetic film, a ceramic magnetic film, or even a layer of ferrous metal, any of which adapt second composite layer to being attracted to a magnetic field. Another material for substrate 42 is a buoyancy matching material such as a plastic having a preselected quantity of particles 44 as a weight-imparting material amended thereto such as a copper powder for a nonmagnetic material or iron particles for a ferromagnetic material. Further, substrate 42 can be fabricated from a soluble or biodegradable material such as a commercially available plastic having starch particles blended into the plastic as particles 44.

First composite layer 30 is adhesively secured to microdot 20 by any suitable adhesive 26 while second composite layer 40 is adhesively secured to the bottom of microdot 20 by any suitable adhesive 46. Adhesive 26 and adhesive 46 may be identical if suitable or have different characteristics, depending upon the material of construction of each of microdot 20, first composite layer 30, and second composite layer 40.

Referring now more particularly to FIG. 2, composite microdot 10 is shown in this cross-sectional view with first composite layer 30 firmly bonded to the top surface of microdot 20 and with second composite layer 40 firmly bonded to the bottom surface of microdot 20. In actual practice, the preparation of composite microdot 10 involves preparing a sheet of substrate 22 and imprinting indicia 24 (FIG. 1) thereon. Thereafter, correspondingly sized sheets of first composite layer 30 and second composite layer 40 are adhesively mounted to substrate 22 using adhesive 26 and adhesive 46, respectively. Composite microdot 10 is then cut from this plurality of layers using conventional microdot cutting techniques. Customarily, composite microdot 10 has a dimension of less than about two millimeters in diameter for most applications although it can be readily produced with larger diameters for specific applications.

Referring now to FIG. 3, composite microdot 10 is shown coated with a coating 12 having certain preselected characteristics. For example, coating 12 can be produced from a simple clay slip wherein finely divided clay powder is suspended in a liquid medium of, say, water or alcohol, and then used to coat composite microdot 10. Evaporation of the liquid medium leaves a residue of clay powder as coating 12. Coating 12 thereby renders composite microdot 10 amenable to being used as a tagging device for a load of contaminated soil or the like (not shown). In this circumstance, a plurality of composite microdots 10 with coating 12 thereon are dispersed into the contaminated soil (not shown) as it is being loaded on to the truck (not shown). This step is done preferably with the full knowledge of the driver to thereby further enhance the incentive for the driver to deliver the load of contaminated soil to the proper disposal site. In any event, if perchance the contaminated soil (not shown) is improperly dumped anywhere else, coating 12 will ultimately wash away exposing the hologram 34 (FIG. 1) to incident light 36 (FIG. 2) resulting in scattered light 38a-38e. The result is that composite microdot 10 is readily observed at a considerable distance even though composite microdot 10 is relatively small. Once observed, composite microdot 10 can be easily retrieved and indicia 24 read and compared to the master file to provide absolute proof as to the origin and placement of the particular composite microdot 10.

Other suitable coatings 12 for composite microdot 10 can include latex-type paints formulated to include, for example, illegal drugs such as opium, heroin, cocaine, or the like to thereby utilize the same camouflage principle as described hereinbefore to trace the origin of these illegal drugs. Under certain circumstances it may be preferable for coating 12 to be water insoluble but to be recoverable by inclusion of a ferromagnetic material in substrate 42 (FIGS. 1 and 2). Once recovered through magnetic attraction, composite microdot 10 can be washed with a suitable solvent to remove coating 12 therefrom thereby rendering indicia 24 readable.

Figure 4:
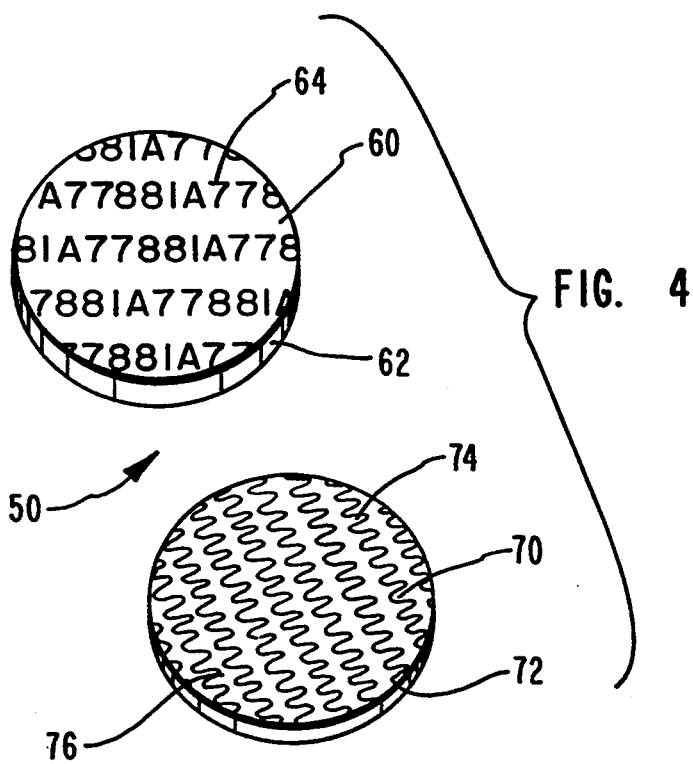
FIG. 4 is a greatly enlarged, exploded perspective view of a second preferred embodiment of the novel composite microdot of this invention.

Referring now to FIG. 4, a second preferred embodiment of the novel, composite microdot of this invention is shown generally at 50 and includes a microdot 60 mounted to a composite layer 70. Microdot 60 is essentially identical to microdot 20 (FIGS. 1 and 2) in that it is fabricated from a substrate 62 having an indicia 64 imprinted thereon. Composite layer 70 in this illustrated embodiment is fabricated from a suitable substrate 72 material capable of having a hologram 74 formed therein. Composite layer 70 can be fabricated from any suitable material as described hereinbefore for composite layers 30 and 40 (FIGS. 1 and 2). An adhesive layer 76 adapts composite layer 70 to being adhesively mounted to the bottom of microdot 60.

Composite microdot 50 is basically similar to composite microdot 10 (FIGS. 1-3) with the exception that composite layer 70 is mounted to the bottom of microdot 60 and there is no second composite layer comparable to second composite layer 40 (FIGS. 1 and 2). The major difference, as stated before, is that composite microdot 50 has only one composite layer thereon, composite layer 70, although composite microdot 50 can include any suitable coating such as coating 12 (FIG. 3) to provide the features imparted by the presence of such a coating.

The Method

The novel method of this invention includes providing a conventional microdot, microdot 20 or 60, with preselected characteristics which are provided by the various composite layers, composite layers 30, 40, or 70, affixed to the particular microdot used. Further, the type of coating 12 also contributes desirable, preselected features to the composite microdots 10 and 50. Composite layers 30, 40, or 70 are selected from substrate materials having at least one of the desired characteristics of enhanced visibility, camouflage, buoyancy control, magnetic attraction, and/or controlled biodegradation. One or more composite layers 30, 40, or 70 are affixed to microdot 20 or 60 thereby imparting to microdot 20 or 60 the preselected characteristics.

Conventionally a microdot substrate 22 or 62 has imparted thereto the preselected indicia, indicia 24 or 64, and then has mounted thereto at least one of composite substrate 32, 42, or 72 after which the entire sandwich-like apparatus (not shown) is cut into a plurality of composite microdots 10 or 50.

Microdot 10 or 50 can then be selectively coated with a coating 12 which imparts to microdot 10 or 50 a preselected characteristic. For example, coating 12 can be waterproof, water repellant, hydrophilic, water soluble, biodegradable, and/or opaque. Clearly, of course, the selection of the particular coating characteristic for coating 12 is a function of the intended application for composite microdot 10 or 50.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A composite microdot comprising:
    a microdot, said microdot comprising a substrate having an indicia on said substrate;
    a first composite layer mounted to said microdot, said first composite layer imparting a preselected characteristic to said microdot; and
    a second composite layer, said second composite layer comprising said preselected characteristic.

2. The composite microdot defined in claim 1 wherein said preselected characteristic of said first composite layer comprises a characteristic selected from the group consisting of enhanced visibility, camouflage, buoyancy control, magnetic attraction, and controlled biodegradation.

3. The composite microdot defined in claim 1 wherein said composite microdot comprises a coating to encapsulate said composite microdot.

4. The composite microdot defined in claim 3 wherein said coating comprises a water soluble material.

5. The composite microdot defined in claim 2 wherein said first composite layer comprises a holographic film, said holographic film configured as a reflective surface to reflect a light striking said composite microdot.

6. The composite microdot defined in claim 2 wherein said first composite layer comprises a magnetic substrate, said magnetic substrate being operable to be attracted to a magnetic field.

7. The composite microdot defined in claim 6 wherein said first composite layer comprises a magnetic substrate fabricated from a magnetic ceramic material, said magnetic ceramic material being selectively included in said first composite layer in an amount to selectively alter the buoyancy of said composite microdot.

8. The composite microdot defined in claim 1 wherein said first composite layer comprises a biodegradable substrate.

9. A composite microdot comprising:
   a microdot, said microdot comprising a first substrate and an indicia on said substrate;
   a first composite layer mounted to said microdot, said first composite layer comprising a second substrate comprising a material having one or more characteristics selected from the group consisting of enhanced visibility, camouflage, buoyancy control, magnetic attraction, and controlled biodegradation;
   a coating on at least said first composite layer, said coating comprising a coating material having one or more characteristics selected from the group consisting of a waterproof coating, a water repellant coating, a hydrophilic coating, a water soluble coating, and an opaque coating; and
   a second composite layer, said second composite layer comprising a third substrate comprising said material of said second substrate.

10. The composite microdot defined in claim 9 wherein said second composite layer comprises said coating.

11. The composite microdot defined in claim 9 wherein said microdot and said first composite layer comprise adhesive means for adhesively mounting said first composite layer to said microdot.

12. A method for preparing a composite microdot comprising:
    preparing a microdot substrate by imparting an indicia on said microdot substrate;
    obtaining a first composite substrate;
    mounting said first composite substrate to said microdot substrate to form a composite microdot substrate;
    obtaining a second composite substrate and mounting said second composite substrate to said microdot substrate opposite said first composite substrate; and
    producing a composite microdot by cutting said composite microdot substrate into a plurality of composite microdots.

13. The method defined in claim 12 wherein said obtaining step comprises preparing said first composite substrate from a material having one or more of the characteristics selected from the group consisting of enhanced visibility, camouflage, buoyancy control, magnetic attraction; and controlled biodegradation.

14. The method defined in claim 12 wherein said producing step includes coating said composite microdots with a coating selected from a coating material having one or more of the characteristics selected from the group consisting of a waterproof coating, a water repellant coating, a hydrophilic coating, a water soluble coating, and an opaque coating.

* * * * *